Sept. 22, 1970    E. O. AMMANN    3,529,885
TEMPERATURE COMPENSATED BIREFRINGENT NETWORKS
Filed Sept. 1, 1967

INVENTOR.
EUGENE O. AMMANN
BY Russell A. Cannon
AGENT 3,529,885
TEMPERATURE COMPENSATED
BIREFRINGENT NETWORKS
Eugene O. Ammann, Mountain View, Calif., assignor to Sylvania Electric Products Inc., a corporation of Delaware
Filed Sept. 1, 1967, Ser. No. 665,030
Int. Cl. G02f 1/24
U.S. Cl. 350—157    2 Claims

ABSTRACT OF THE DISCLOSURE

A pair of naturally birefringent uniaxial crystals having rates of change of retardation with respect to temperature of the opposite sense are cascaded. The crystals are oriented with their fast axes perpendicular to each other when the associated changes in birefringence with respect to temperature are unequal in magnitude and of the same sense. Conversely, the crystal fast axes are parallel when the associated changes in birefringence with respect to temperature are of opposite sense. (The fast and slow axes are defined as the principal axes of the crystal associated with the rays that experience minimum and maximum retardation (travel fastest and slowest, respectively), in passing through the crystal.) The lengths of the crystals in the direction of propagation are predetermined so the incremental retardation of the crystals for a given change in temperature are equal and of opposite sense and therefore cancel. Thus, the net retardation produced by the crystals is substantially independent of temperature. (The lengths of the crystals are defined by Equation 1.)

BACKGROUND OF INVENTION

This invention relates to optical birefringent networks and more particularly to compensating birefringent networks for changes in temperature.

Birefringence results in the splitting of a ray of incident light into two components, the ordinary ray and the extraordinary ray, which travel at different velocities. These velocities are inversely proportional to the indices of refraction of the birefringent element. Thus, a single naturally birefringent crystal produces a difference in phase between the ordinary and the extraordinary rays propagated through the crystal. A birefringent filter may comprise a plurality of stages. Each stage may comprise a naturally birefringent crystal providing a particular phase delay or retardation. It is desirable that the individual retardation be a function only of the length and birefringence of the associated crystal. However, since the indices of refraction, and thus the birefringence of a crystal, vary with temperature the retardation produced by the crystal also varies with temperature. In order to maintain this retardation constant, networks incorporating naturally birefringent crystals are operated in an environment such as an oven wherein the temperature is maintained constant, typically to within ±0.01° C.

An object of this invention is the provision of a circuit exhibiting a retardation that is substantially independent of changes in temperature.

SUMMARY OF INVENTION

In accordance with this invention, a pair of birefringent elements having rates of change of birefringence with respect to temperature of the opposite sense are cascaded so that incident light passes through both of the elements. The elements are oriented with their fast axes parallel and their slow axes also parallel. The lengths $L_1$ and $L_2$ of the elements in the direction of propagation of incident light are chosen to satisfy the relationship $$L_2 = -L_1 \frac{d(\Delta\eta_1)/dT}{d(\Delta\eta_2)/dT} \qquad (1)$$

wherein $\Delta\eta_1$ and $\Delta\eta_2$ are the respective birefringences of the elements, and $d(\Delta\eta_1)/dT$ and $d(\Delta\eta_2)/dT$ are the rates of change of birefringence with respect to temperature of the elements. For this choice of element lengths the incremental retardations of the elements are equal in magnitude and of opposite sense and therefore cancel. Thus, the net retardation produced by the elements is substantially independent of changes in temperature.

In a modified form of this invention, the elements have rates of change of birefringence with respect to temperature of the same sense. For this case, the elements are oriented such that the fast axis of one is parallel to the slow axis of the other. The magnitudes of the lengths of these elements are again chosen to satisfy Equation 1.

DESCRIPTION OF DRAWINGS

This invention will be more fully understood from the following detailed description of preferred embodiments thereof, together with the accompanying drawings in which.

DESCRIPTION OF PREFERRED EMBODIMENTS

Figure 1:
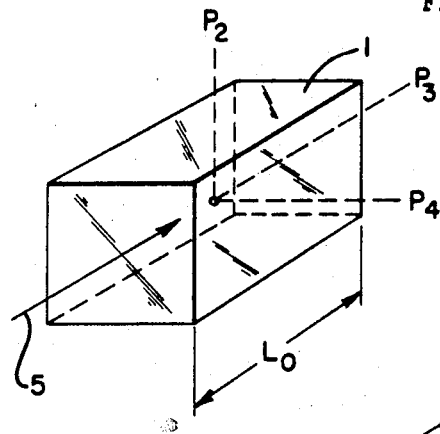
FIG. 1 is a schematic view of a birefringent crystal.

Referring now to FIG. 1, a naturally birefringent uniaxial crystal 1 comprising one stage of an optical network such as a filter is normally oriented so the optic axis $OP_2$ (a principal axis of the crystal) is perpendicular to the direction of propagation of an incident light beam 5. The other principal axes $OP_3$ and $OP_4$ of the crystal are parallel and perpendicular, respectively, to the direction of propagation of incident light beam. The indices of refraction of the crystal along the principal axes $OP_2$ and $OP_4$ perpendicular to the direction of the propagation of the light beam must be different.

The light beam is divided by the crystal into components polarized in the direction of the principal axes $OP_2$ and $OP_4$. The component polarized in the direction of optic axis $OP_2$ is called the extraordinary ray. The component polarized in the direction of the axis $OP_4$ is called the ordinary ray. The ordinary and extraordinary rays travel in the crystal at different velocities which are inversely proportional to the indices of refraction, $\eta_O$ and $\eta_E$, respectively, along the associated axes. In negative uniaxial crystals, such as calcite, $\eta_E$ is less than $\eta_O$ and the extraordinary ray travels faster than the ordinary ray. However, in positive uniaxial crystals, such as quartz, $\eta_O$ is less than $\eta_E$ and the ordinary ray travels faster than the extraordinary ray. The axis associated with the ray that travels the faster (minimum retardation) in the crystal is defined herein as the fast axis. Conversely, the axis associated with the ray that travels slower (maximum retardation) in the crystal is defined as the slow axis. Thus, in a negative crystal, the extraordinary ray is polarized in the direction of the fast axis whereas the ordinary ray is polarized in the direction of the slow axis. In a positive crystal, however, the ordinary ray is polarized in the direction of the fast axis and the extraordinary ray is polarized in the direction of the slow axis.

Figure 2:
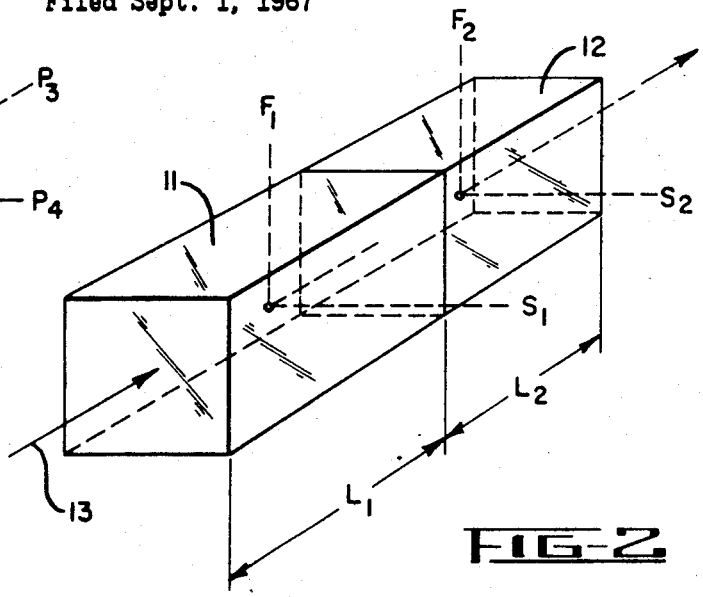
FIG. 2 is a schematic view of a circuit embodying this invention.

Referring now to FIG. 2, a temperature-compensated circuit (one stage of a temperature-compensated network) embodying this invention comprises a pair of naturally birefringent uniaxial crystals 11 and 12. The crystals are cascaded so that incident light beam 13 passes through the crystals over their lengths $L_1$ and $L_2$. The rates of change of birefringence with respect to temperature of the crystals are of the opposite sense. The crystals are oriented so that the crystal fast axes $F_1$ and $F_2$ are parallel as are the slow axes $S_1$ and $S_2$. Crystal 11 may, by way of example, be a calcite crystal having a negative rate of change of birefringence with respect to temperature. Crystal 12 then may, by way of example, be a lithium titanate crystal having a positive rate of change of birefringence with respect to temperature.

Consider now the effect of the crystals on the incident light beam. Crystal 11 divides the light beam into a pair of components polarized in the directions of the fast and slow axes and traveling at different velocities in the crystal. The retardation $\delta_1$ (in radians) introduced by crystal 11 between these components is representable as $$\delta_1 = \frac{\omega}{c} L_1 (\eta_{01} - \eta_{E1}) \quad (2)$$

$$= \frac{\omega}{c} L_1 (\Delta \eta_1) \quad (3)$$

where $\omega$ is the radian frequency of the light, $c$ is the velocity of light in a vacuum, $\eta_{01}$ and $\eta_{E1}$ are the indices of refraction of crystal 11 associated with the ordinary and extraordinary rays, respectively, and $\Delta \eta_1$ is the birefringence of crystal 11. It is desirable that this retardation $\delta_1$ be a function of the length and indices of refraction of the crystal and be independent of temperature. The dependence of the retardation on temperature is found by differentiating Equation 3 and is representable as $$\frac{d(\delta_1)}{dT} = \frac{\omega}{c} L_1 \frac{d(\Delta \eta_1)}{dT} \quad (4)$$

where $$\frac{d(\delta_1)}{dT}$$

is the rate of change of retardation with respeect to temperature provided by crystal 11. The effect of a change in crystal $L_1$ with respect to temperature is assumed to be small compared to the effect of a change in $\Delta \eta$. The rate of change of retardation $\delta_2$ with respect to temperature provided by crystal 12 is determine din a similar manner to be $$\frac{d(\delta_2)}{dT} = \frac{\omega}{c} L_3 \frac{d(\Delta \eta_2)}{dT} \quad (5)$$

where $L_2$ is the length of crystal 12 and $\Delta \eta_2$ is the birefringence of crystal 12.

The total or net retardation $\delta_A$ produced by crystals 11 and 12 is the sum of the retardations produced by the individual crystals and is representable as $$\delta_A = \frac{\omega}{c} [L_1(\Delta \eta_1) + L_2(\Delta \eta_2)] \quad (6)$$

In order for this net retardation to be independent of changes in temperature, $$\frac{d(\delta_1)}{dT} \text{ and } \frac{d(\delta_2)}{dT}$$

the rates of change of retardation as a function of temperature produced by crystals 11 and 12 must be of equal magnitude and opposite sense. This result is expressed mathematically by setting Equation 4 equal to the negative of (5) which gives $$\frac{\omega}{c} L_1 \frac{d(\Delta \eta_1)}{dT} = -\frac{\omega}{c} L_2 \frac{d(\Delta \eta_2)}{dT} \quad (7)$$

Rearranging the terms in Equation 7, the length of crystal 11 required for the net retardation of the circuit of FIG. 2 to be independent of temperature is found to be $$L_1 = -L_2 \frac{d(\Delta \eta_2)/dT}{d(\Delta \eta_1)/dT} \quad (8)$$

Since $d(\Delta \eta_1)/dT$ is negative, the crystal lengths defined by Equation 8 are positive.

Figure 3:
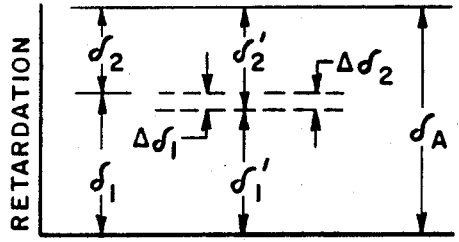
FIG. 3 is a graphic representation of the retardation provided by the circuit of FIG. 2.

This operation is illustrated graphically in FIG. 3 wherein $\delta_1$ and $\delta_2$ represent the retardations produced by crystals 11 and 12, respectively, for a prescribed temperature $T_0$. The net retardation provided by the circuit is $\delta_A = \delta_1 + \delta_2$. An increase in temperature $\Delta T$ causes the crystals to produce the new retardations $\delta_1'$ and $\delta_2'$. The changes $\Delta \delta_1$ and $\Delta \delta_2$ in retardation produced by the associated crystals are of equal magnitude and opposite sense and therefore cancel. Thus, the net retardation produced by the circuit comprising crystals 11 and 12 is independent of temperature.

Figure 4:
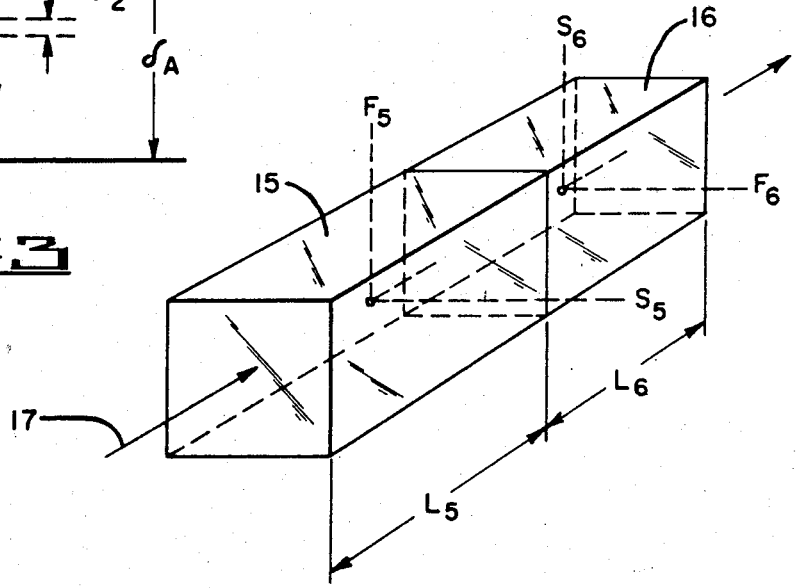
FIG. 4 is a schematic view of a circuit embodying a modified form of this invention.

Referring now to FIG. 4, a temperature-compensated circuit embodying a modified form of this invention comprises a pair of birefringent uniaxial crystals 15 and 16. The crystals are oriented so that the fast axis of one crystal is parallel to the slow axis of the other. Crystals 15 and 16 are also cascaded so that incident light 17 passes through the crystals over their lengths $L_5$ and $L_6$. The rates of change of birefringence with respect to temperature of crystals 15 and 16 have different magnitudes, but are of the same sense. The net retardation $\delta_B$ produced by the circuit of FIG. 4 is the difference between the retardations produced by the individual crystals and is representable as $$\delta_B = \frac{\omega}{c} [L_1(\Delta \eta_1) - L_2(\Delta \eta_2)] \quad (9)$$

The orientation of the fast and slow axes of crystals 15 and 16 effectively changes the sense of the retardation produced by the latter crystal. The length of crystal 15 is defined by Equation 8. It is desirable that the crystals satisfy the following conditions:

$$\frac{d(\Delta \eta_6)}{dT} > \frac{d(\Delta \eta_5)}{dT} \quad (10)$$

$$\Delta \eta_6 > \Delta \eta_5 \quad (11)$$

wherein $\Delta \eta_5$ and $\Delta \eta_6$ are the birefringences of crystals 15 and 16 respectively, since the total retardation provided by the circuit of FIG. 4 is less than the maximum obtainable retardation provided by the individual crystals. Lithium niobate and calcite satisfy these conditions.

Figure 5:
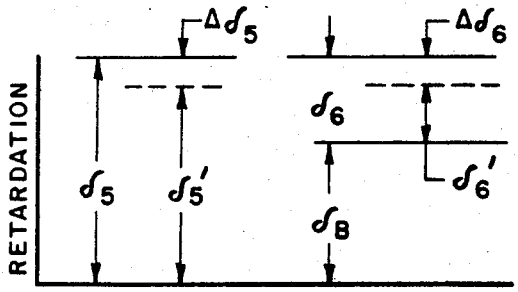
FIG. 5 is a graphic representation of the retardation provided by the circuit in FIG. 4.

The operation of the circuit of FIG. 4 is illustrated graphically in FIG. 5 wherein $\delta_5$ and $\delta_6$ are the retardations produced by the associated crystals 15 and 16 for a given temperature $T_0$. The net retardation provided by the crystals of FIG. 4 is $\delta_B = \delta_5 - \delta_6$. An increase $\Delta T$ in temperature causes crystals 15 and 16 to produce new phase delays $\delta_5'$ and $\delta_6'$. Since the resultant retardation changes $\Delta \delta_5$ and $\Delta \delta_6$ are of equal magnitude and the same sense, the net retardation $\delta_B$ produced by the circuit comprising crystals 15 and 16 is independent of temperature.

Although this invention is described in relation to preferred embodiments thereof, changes, improvements and modifications will be apparent to those skilled in the art without departing from the spirit of the invention. For example, networks embodying this invention may comprise birefringent elements other than naturally birefringent crystal, e.g., elements that exhibit electrically induced birefringence. Also, the invention is not limited to birefringent elements that are uniaxial. Further, this invention is not limited to the specific types of crystals, elements or arrangements described above. For example, the circuit elements may comprise optically active media such as specially oriented quartz crystals having different indices of refraction for right and left hand circularly polarized light. The scope of this invention is, therefore, to be determined from the appended claims rather than from the above detailed description.

What is claimed is:

1. An optical circuit providing a retardation that is substantially independent of changes in temperature comprising a pair of dissimilar naturally birefringent crystals having rates of change of natural birefringence with respect to temperature of unequal magnitude and the same sense, said crystals each having a fast axis and a slow axis and being cascaded for successively passing an incident light beam, said crystals providing a net cumulative retardation due to natural birefringence which is nonzero, said crystals oriented so the fast axis of one crystal is parallel to the slow axis of the other crystal, the respective lengths $L_1$ and $L_2$ of said crystals satisfying the relationship $$L_2 = \left| L_1 \frac{d(\Delta\eta_1)/dT}{d(\Delta\eta_2)/dT} \right|$$

where $\Delta\eta_1$ and $\Delta\eta_2$ are the respective birefringences of said crystals and $d(\Delta\eta_1)/dT$ and $d(\Delta\eta_2)/dT$ are the respective rates of change of birefringence with respect to temperature of said crystals.

2. An optical circuit providing a nonzero retardation due to natural birefringence that is substantially independent of changes in temperature comprising a pair of dissimilar naturally birefringent crystals having rates of change of birefringence with respect to temperature of opposite sense, said crystals each having a fast axis and a slow axis and being cascaded for successively passing an incident light beam, said crystals being oriented so the respective fast axes and the respective slow axes are parallel, the respective lengths $L_1$ and $L_2$ of said crystals satisfying the relationship $$L_2 = \left| L_1 \frac{d(\Delta\eta_1)/dT}{d(\Delta\eta_2)/dT} \right|$$

where $\Delta\eta_1$ and $\Delta\eta_2$ are the respective birefringences of said crystals and $d(\Delta\eta_1)/dT$ and $d(\Delta\eta_2)/dT$ are the respective rates of change of birefringence with respect to temperature of said crystals.

References Cited

UNITED STATES PATENTS 3,325,646   6/1967   Reichel et al. _____ 350—150

OTHER REFERENCES

"Temperature Dependence of Orientation Birefringence of Polymers in the Glassy and Rubbery States," R. Andrews et al., Journal of Polymer Science, Part C, No. 5, pp. 101–112, Aug. 24, 1963.

"Photoelastic Properties of Polystyrene in the Glassy State—Effect of Temperature," by J. Rudd et al., Journal of Applied Physics, vol. 28, No. 10, October 1957, pp. 1096–1105.

DAVID SCHONBERG, Primary Examiner

M. J. TOKAR, Assistant Examiner

U.S. Cl. X.R.

350—160